(No Model.)

C. F. WILLNER.
Feathering Paddle Wheel.

No. 243,026. Patented June 14, 1881.

Witnesses.
Robt Everett
Vinton Coombs

Inventor.
Christian F. Willner.
By James L. Norris.
Atty.

N. PETERS, Photo-Lithographer, Washington, D. C.

UNITED STATES PATENT OFFICE.

CHRISTIAN F. WILLNER, OF GREAT BEND, KANSAS.

FEATHERING PADDLE-WHEEL.

SPECIFICATION forming part of Letters Patent No. 243,026, dated June 14, 1881.

Application filed April 27, 1881. (No model.)

*To all whom it may concern:*

Be it known that I, CHRISTIAN F. WILLNER, a citizen of the United States, residing at Great Bend, in the county of Barton and State of Kansas, have invented new and useful Improvements in Paddle-Wheels, of which the following is a specification.

My invention relates to feathering paddle-wheels for steam-vessels, in which the paddles or blades are arranged to enter and leave the water obliquely or edgewise, and while immersed and traveling through the water to assume a vertical position.

The object of this invention is to provide improved means for attaining such end; and the improvement will be fully set forth in the following description, and particularly pointed out in the claim.

Figure 1:
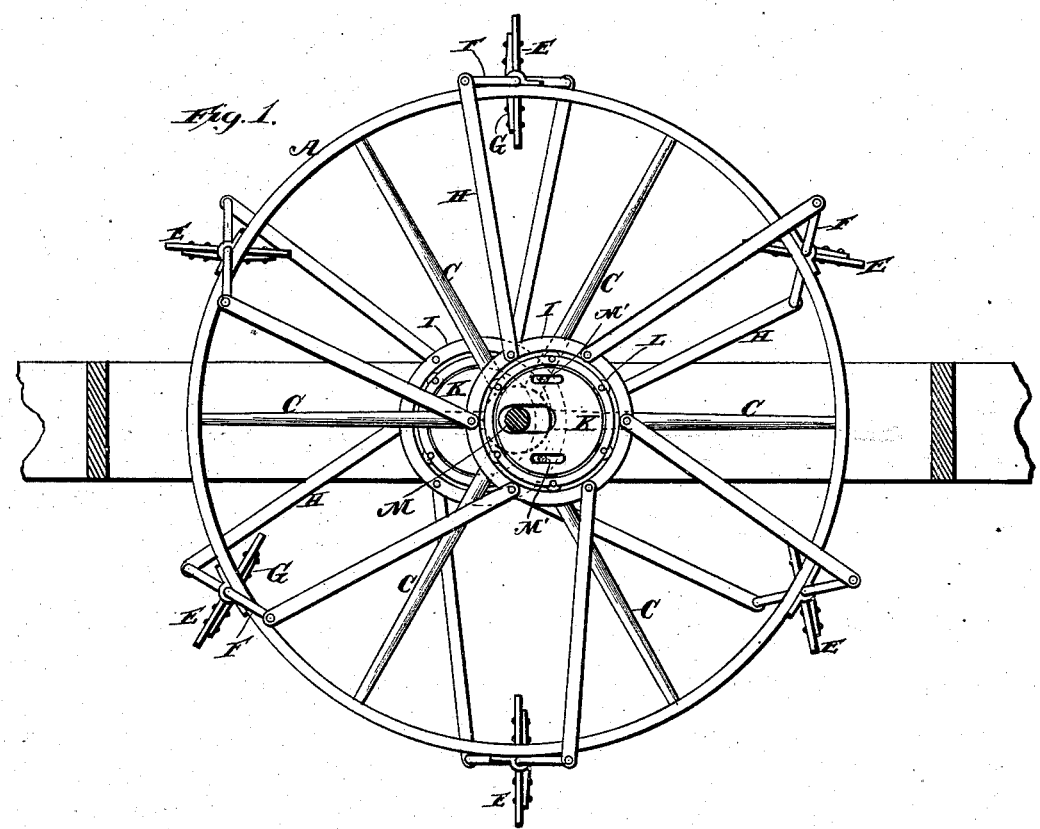
Figure 2:
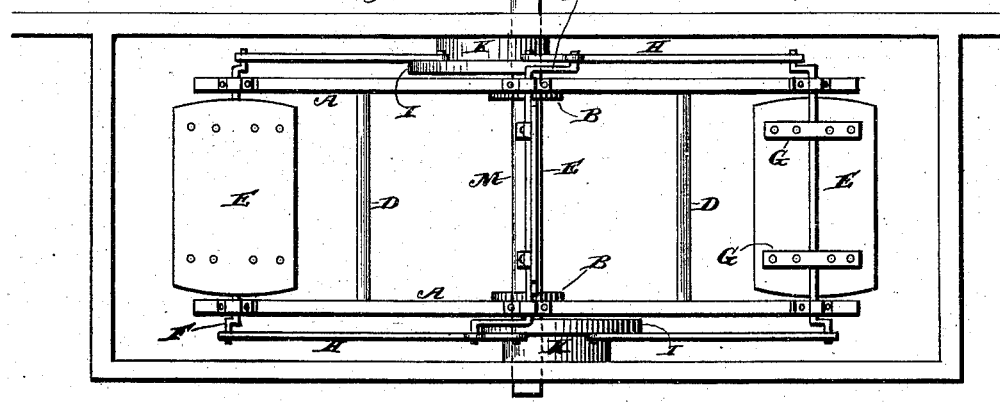

In the drawings, Figure 1 is a side elevation with the front portion of the frame in which the paddle is arranged removed, and Fig. 2 is a top or plan view.

A A indicate the outer rings of the wheel. These outer rings are connected with the centers B upon the paddle-wheel shaft by means of the radial arms C; and, if desired, rings intermediate of the centers and the outer rings can be employed, so as to give greater strength to the wheel. The outer rings, A, of the wheel are connected together by means of stays D, in the usual way.

The axes of the paddles E are journaled in bearings upon the outer rings of the wheels, each axis or shaft being provided at its ends with crank-arms F, radiating from the shaft in opposite directions. The paddles can be made of wood or metal, and will be strengthened, particularly in the former construction, by the brace-plates G G, that are securely bolted onto the paddles.

The radial arms H, that connect with the crank-arms of the paddles, are secured at their inner ends to center rings, I I, one of which is provided for each set of radial arms. These rings partake of the rotary movement of the wheel through the medium of the above-mentioned connections, and are arranged to turn upon the stationary circular bearings K, between which and the said rings anti-friction rollers L can be employed in order to lessen friction. The paddle-wheel shaft M passes through these bearings, and the bearings are arranged eccentrically to the axis of the paddle-wheel shaft. The centers of these circular bearings are at opposite sides of the paddle-wheel shaft, so that the said bearings will be diagonally opposite each other, so that during the rotation of the paddle-wheel the two sets of radial arms connecting the rings upon the circular bearings with the crank-arms of the paddle-shafts will be moved radially in reverse directions at the same time that they are carried round with the wheel. This action on the part of the two sets of radial arms insures the perfect action of the paddles and steadies the same in their movement. The effect of this arrangement of cranks, radial arms connecting therewith, and the rings upon the circular eccentrically-arranged bearings will be to cause the paddles to feather during operation, the paddles entering the water and leaving the same edgewise or obliquely, and traveling through the same while immersed in a vertical position. The circular bearings will be adjustably secured to the frame within which the wheel works, so that they can be set more or less eccentric to the axis of the paddle-wheel shaft, in order to vary the angle at which the paddles will enter and leave the water.

Should the boat be heavily loaded and the wheels be consequently deep in the water, the circular bearings should be set so that the paddles will enter the water at a greater angle than if the boat is lightly loaded and sits high in the water. This adjustment of the said bearings can be effected in various ways—as, for example, by means of set-screws or bolts M' passing through slots in the bearings or the frame to which the bearings are secured, said bolts serving to hold the bearings K in adjustment upon the frame. The paddle-wheel shaft M will pass through a slot in the bearings, whereby the position of the latter can be shifted.

What I claim is—

The combination, in a paddle-wheel, of the paddles secured upon axes having crank-arms at their ends turned in reverse directions, the two sets of radial arms connecting the crank-arms with the rotary center rings, and the circular stationary bearings upon which the rings are mounted arranged eccentrically to the axis of the paddle-wheel shaft, which passes through the circular bearings, whereby during operation the two sets of radial arms actuating the cranks will move in radial lines in reverse directions as they are carried round with the wheel, substantially as described.

In testimony whereof I have hereunto set my hand in the presence of two subscribing witnesses.

CHRISTIAN F. WILLNER.

Witnesses:
SAM. J. DAY,
E. L. CHAPMAN.